US012686579B2

(12) United States Patent
Abe et al.

(10) Patent No.: US 12,686,579 B2
(45) Date of Patent: Jul. 21, 2026

(54) SHEET TAKEOUT METHOD

(71) Applicant: TOYOTA JIDOSHA KABUSHIKI KAISHA, Toyota (JP)

(72) Inventors: Nobuhira Abe, Miyoshi (JP); Yuto Narita, Nagoya (JP); Yuichi Itoh, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/973,768

(22) Filed: Dec. 9, 2024

(65) Prior Publication Data

US 2025/0197143 A1      Jun. 19, 2025

(30) Foreign Application Priority Data

Dec. 18, 2023      (JP) ................................. 2023-213243

(51) Int. Cl.
  *B65H 3/08*          (2006.01)
  *B65H 3/54*          (2006.01)
  *H01M 10/04*        (2006.01)
(52) U.S. Cl.
  CPC ......... *B65H 3/0883* (2013.01); *B65H 3/0816* (2013.01); *B65H 3/54* (2013.01); *H01M 10/0404* (2013.01); *B65H 2701/19* (2013.01)
(58) Field of Classification Search
  CPC .......... B65H 3/50; B65H 3/56; B65H 3/0883; B65H 3/0816; B65H 5/54
  See application file for complete search history.

(56) References Cited

U.S. PATENT DOCUMENTS

| | | | | | |
|---|---|---|---|---|---|
| 4,516,762 | A | * | 5/1985 | Moltrasio | ................ B65H 5/10 |
| | | | | | 271/106 |
| 5,676,364 | A | * | 10/1997 | Shiiki | .................. B65H 3/0816 |
| | | | | | 271/106 |
| 11,274,002 | B2 | * | 3/2022 | Abe | ......................... B65H 3/48 |
| 2009/0205524 | A1 | * | 8/2009 | Komiyama | .............. B65H 3/06 |
| | | | | | 101/477 |
| 2020/0354178 | A1 | | 11/2020 | Abe et al. | |
| 2024/0416407 | A1 | * | 12/2024 | Jacob | ....................... B65H 3/50 |

FOREIGN PATENT DOCUMENTS

| | | | | | |
|---|---|---|---|---|---|
| DE | 102022104665 | A1 | * | 12/2022 | .............. B65H 3/32 |
| EP | 2149521 | A1 | * | 2/2010 | .......... B65H 3/0883 |
| JP | H08-188276 | A | | 7/1996 | |
| JP | 2003182846 | A | * | 7/2003 | |
| JP | 2020-183312 | A | | 11/2020 | |
| WO | WO-2024041765 | A1 | * | 2/2024 | .......... B65H 3/0841 |

* cited by examiner

*Primary Examiner* — Patrick Cicchino
(74) *Attorney, Agent, or Firm* — Oliff PLC

(57) ABSTRACT

A sheet takeout method includes: pressing, when a restraint device is in a restrained state, a transfer plate which is in a horizontal state to pickup and hold a topmost sheet member; pressing the sheet members by an inelastic deformation part of the transfer plate while setting the restraint device to be in a non-restrained state and setting the transfer plate to be in an elastically deformed state; inserting a restraining blade into a space formed between the topmost sheet member and its underlying sheet member and setting the restraint device to be in the restrained state again; returning the transfer plate that has picked up and held the topmost sheet member to a horizontal state while retracting the transfer plate upward; and transferring the topmost sheet member picked up and held by the transfer plate to a receiving holder.

4 Claims, 6 Drawing Sheets

FRONT VIEW

SIDE VIEW

SHEET TAKEOUT METHOD

CROSS REFERENCE TO RELATED APPLICATIONS

This application is based upon and claims the benefit of priority from Japanese patent application No. 2023-213243, filed on Dec. 18, 2023, the disclosure of which is incorporated herein in its entirety by reference.

BACKGROUND

The present disclosure relates to a sheet takeout method, and more particularly to a sheet takeout method performed by a sheet takeout device.

Japanese Unexamined Patent Application Publication No. 2020-183312 discloses a placement method performed by a placement device that takes out a topmost sheet member from among a plurality of sheet members horizontally placed on a placement station in a pre-stacked state and transferring the topmost sheet member that has been taken out.

Japanese Unexamined Patent Application Publication No. 2020-183312 discloses a placement method performed by a placement device, which includes a first process for pressing, when a restraint device is in a restrained state, a transfer plate which is in a horizontal state against a topmost sheet member to pick up and hold the topmost sheet member; a second process for setting, after the first process, the restraint device to a non-restrained state to incline the transfer plate and pressing the plurality of sheet members from an upper side of the stacking direction by a base end of the transfer plate which is in the inclined state; a third process for inserting, after the second process, a restraining blade into a space formed between the topmost sheet member and a sheet member provided below the topmost sheet member, and a fourth process for returning, after the third process, the transfer plate in which the topmost sheet member is picked up and held back to the horizontal state while retracting the transfer plate upward, and transferring the topmost sheet member picked up and held by the transfer plate back to the holder.

SUMMARY

According to the technique disclosed in Japanese Unexamined Patent Application Publication No. 2020-183312, in the process of taking out the topmost sheet member, a plurality of sheet members can always be restrained by the restraining blade or transfer plate from the upper side of the stacking direction. Therefore, it is disclosed in Japanese Unexamined Patent Application Publication No. 2020-183312 that even when the sheet members are stacked in an unstable state, it is possible to prevent the sheet members from falling down or becoming offset in position.

FIG. 6 is a diagram for explaining a problem caused by a ratio of a restrained part to a tilted part in a sheet-shaped member. When the ratio of the restrained part of the topmost sheet member S to be restrained by the base end of the inclined transfer plate P is set to be large in the above second process, as shown in the lower left of FIG. 6, the ratio of the tilted part of the topmost sheet member S to be tilted by the transfer plate P becomes relatively small. If the ratio of the tilted part becomes too small, a sufficient space cannot be secured between the topmost sheet member S and a sheet member S provided below the topmost sheet member S, and the restraining blade B inserted into the space in the third process described above may interfere with the sheet member S. Therefore, in order to insert the restraining blade B without interference, it is necessary to increase the space.

Therefore, in order to increase the space, as shown in the lower right of FIG. 6, it is conceivable to increase the ratio of the tilted part in the topmost sheet member S. However, when the ratio of the tilted part is set to be large, the ratio of the restrained part becomes relatively small. If the ratio of the restrained part becomes too small, there is a problem that, when the restrained part is restrained by the base end of the transfer plate P which is set to be the inclined state in the second process, the sheet member S may jump out of the plurality of stacked sheet members S and fall down, or the sheet member S may shift from a position suitable for picking up.

The present disclosure has been made to solve such a problem, and an object of the present disclosure is to provide a sheet takeout method in which a plurality of stacked sheet members are prevented from falling down or the sheet members from becoming offset in position by restraining the plurality of stacked sheet members from an upper side of the stacking direction in a process of taking out a topmost sheet member from the plurality of sheet members.

A sheet takeout method according to one embodiment is a sheet takeout method performed by a sheet takeout device for taking out a topmost sheet member from among a plurality of sheet members horizontally placed on a placement station in a pre-stacked state, in which the sheet takeout device includes: a restraint device that includes a restraining blade for restraining the plurality of sheet members from an upper side of a stacking direction thereof, is arranged on a side of the placement station, and is configured to be able to switch between a restrained state for restraining the plurality of sheet members by the restraining blade from the upper side of the stacking direction and a non-restrained state for retracting the restraining blade from the upper side of the plurality of sheet members and releasing the restraint by the restraining blade; and a transfer device that includes a transfer plate including a plurality of pickup and holding parts for picking up and holding the topmost sheet member from the upper side of the stacking direction in which the plurality of sheet members are stacked, is arranged so as to be opposed to the restraint device in a short direction of the sheet member with the placement station therebetween, and is configured to be able to switch a state of the transfer plate between a horizontal state in which the transfer plate is opposed to the topmost sheet member so as to be parallel thereto and an elastically deformed state in which an elastically deformable elastic deformation part including the pickup and holding part arranged in one end side or both end sides of the sheet member in a longitudinal direction that is orthogonal to the short direction is elastically deformed so as to deflect upward, and the sheet takeout method includes: a first process for of pressing, when the restraint device is in the restrained state, the transfer plate which is in the horizontal state against the topmost sheet member from the upper side of the stacking direction in which the plurality of sheet members are stacked to pickup and hold the topmost sheet member; a second process of pressing, after the first process, the plurality of sheet members from the upper side of the stacking direction by an inelastic deformation part of the transfer plate which is in the elastically deformed state while setting the restraint device to be in the non-restrained state and setting the transfer plate to be in the elastically deformed state; a third process of inserting, after the second process, the restraining blade into a space formed between the topmost sheet member and a sheet member provided below the topmost sheet member by setting the transfer plate to be in the elastically deformed state in the second process, and setting the restraint device to be in the restrained state again; a fourth process of returning, after the third process, the transfer plate that has picked up and held the topmost sheet member to the horizontal state while retracting the transfer plate upward; and a fifth process of transferring, after the fourth process, the topmost sheet member picked up and held by the transfer plate to a receiving holder.

According to the present disclosure, it is possible to provide a sheet takeout method a sheet takeout method in which a plurality of stacked sheet members are prevented from falling down or the sheet members from becoming offset in position by restraining the plurality of stacked sheet members from an upper side of the stacking direction in a process of taking out a topmost sheet member from the plurality of sheet members.

The above and other objects, features and advantages of the present disclosure will become more fully understood from the detailed description given hereinbelow and the accompanying drawings.

BRIEF DESCRIPTION OF DRAWINGS

FIG. 5A is a side view and a front view explaining a sheet takeout method performed by the sheet takeout device in the second embodiment;

4

Figures 5A, 5B, 5C, 5D, 5E, 5F, 5G, 5H:
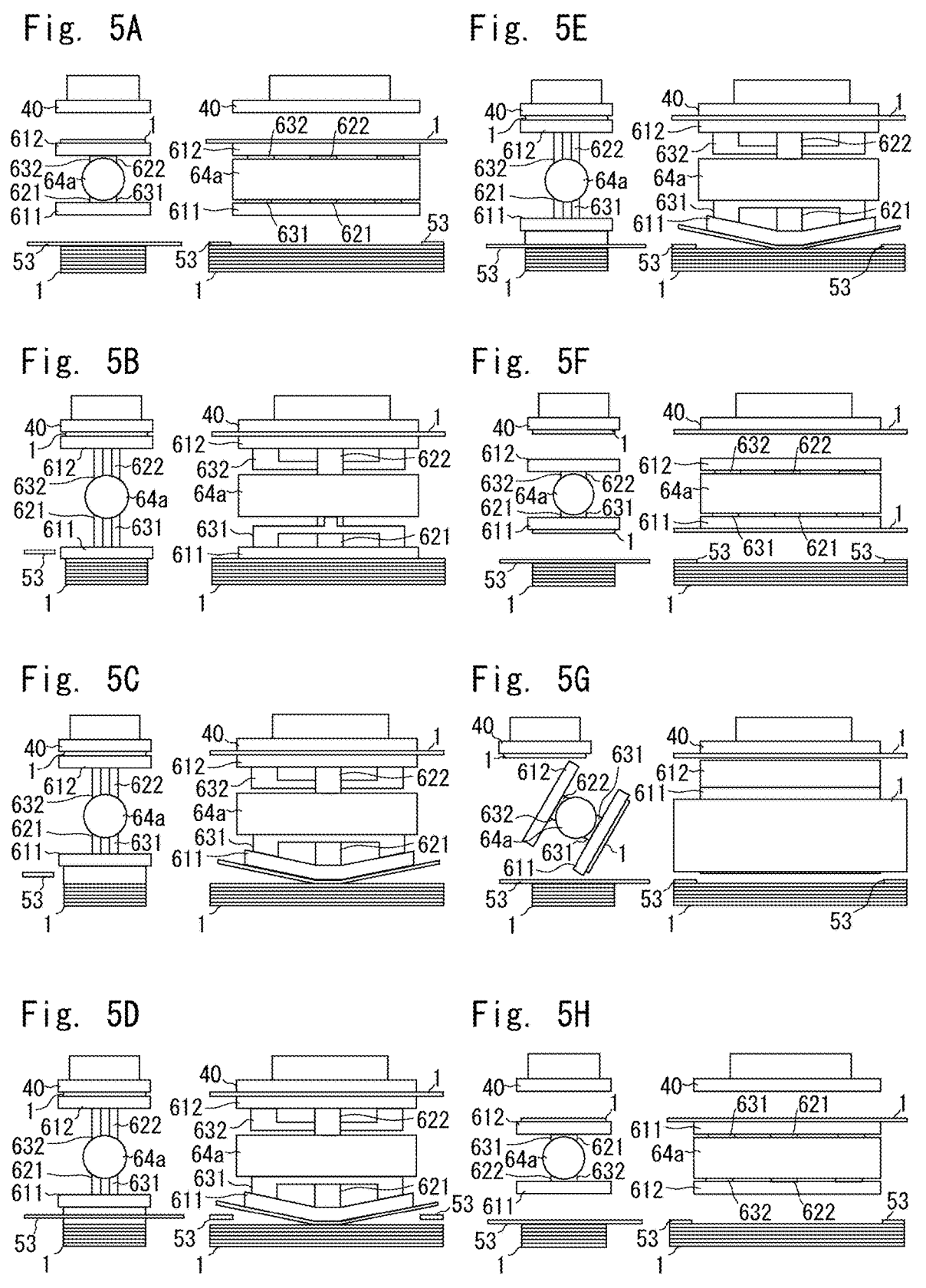
Figure 6:
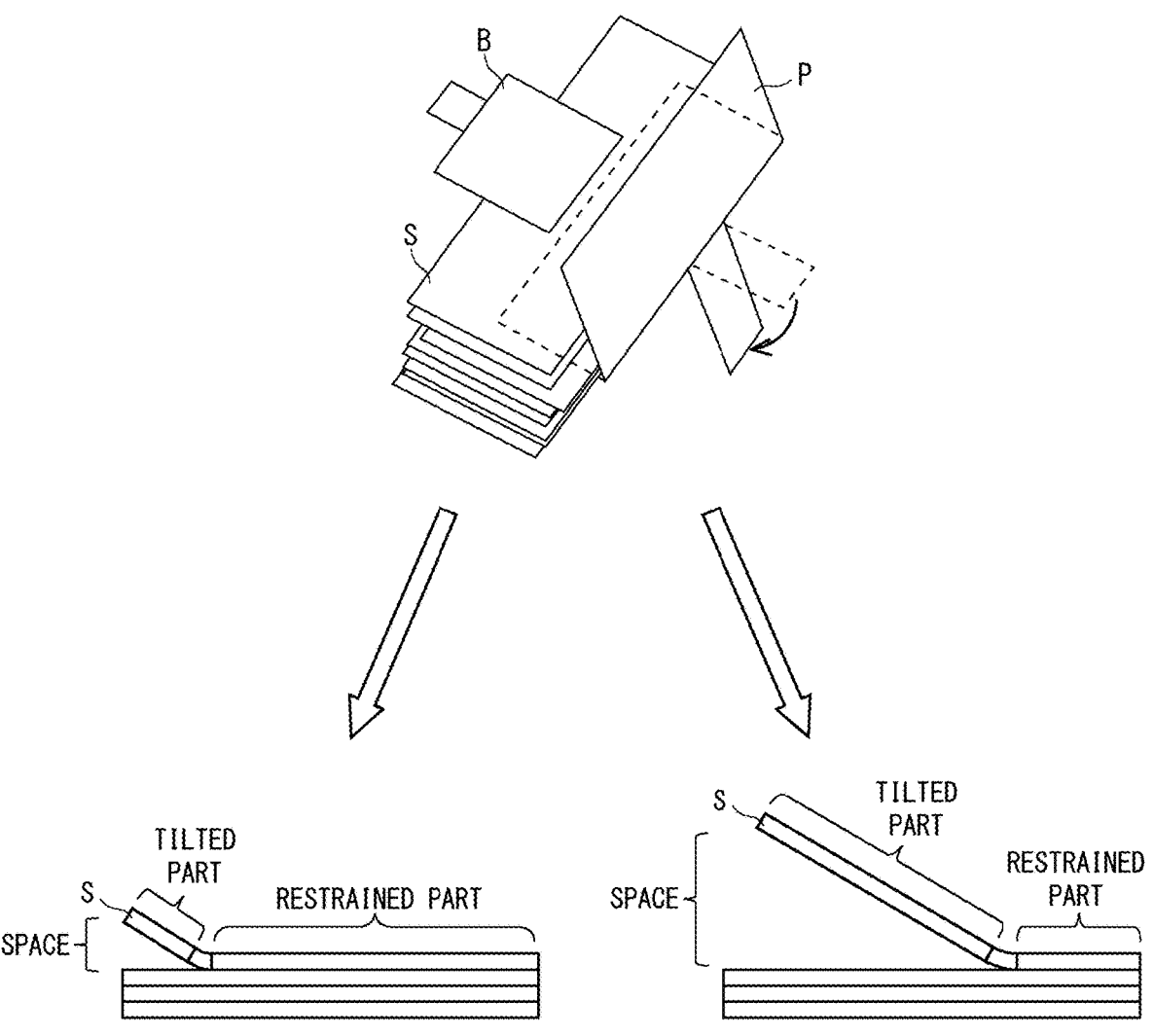

FIG. 5B is a side view and a front view explaining the sheet takeout method performed by the sheet takeout device in the second embodiment;

FIG. 5C is a side view and a front view explaining the sheet takeout method performed by the sheet takeout device in the second embodiment;

FIG. 5D is a side view and a front view explaining the sheet takeout method performed by the sheet takeout device in the second embodiment;

FIG. 5E is a side view and a front view explaining the sheet takeout method performed by the sheet takeout device in the second embodiment;

FIG. 5F is a side view and a front view explaining the sheet takeout method performed by the sheet takeout device in the second embodiment;

FIG. 5G is a side view and a front view explaining the sheet takeout method performed by the sheet takeout device according to the second embodiment;

FIG. 5H is a side view and a front view explaining the sheet takeout method performed by the sheet takeout device according to the second embodiment; and FIG. 6 illustrates a problem caused by a ratio of a restrained part to a tilted part in a sheet-shaped member.

DESCRIPTION OF EMBODIMENTS

First Embodiment

Hereinafter, embodiments of the present disclosure will be described with reference to the drawings. However, the present disclosure is not limited to the following embodiments. For clarity of explanation, the following description and drawings are simplified as appropriate. Those shown in the figures are only a part of the whole, and many other configurations not shown are actually included. In the following description, the same or equivalent elements are denoted by the same reference numerals, and duplicate descriptions are omitted.

Figure 1A:
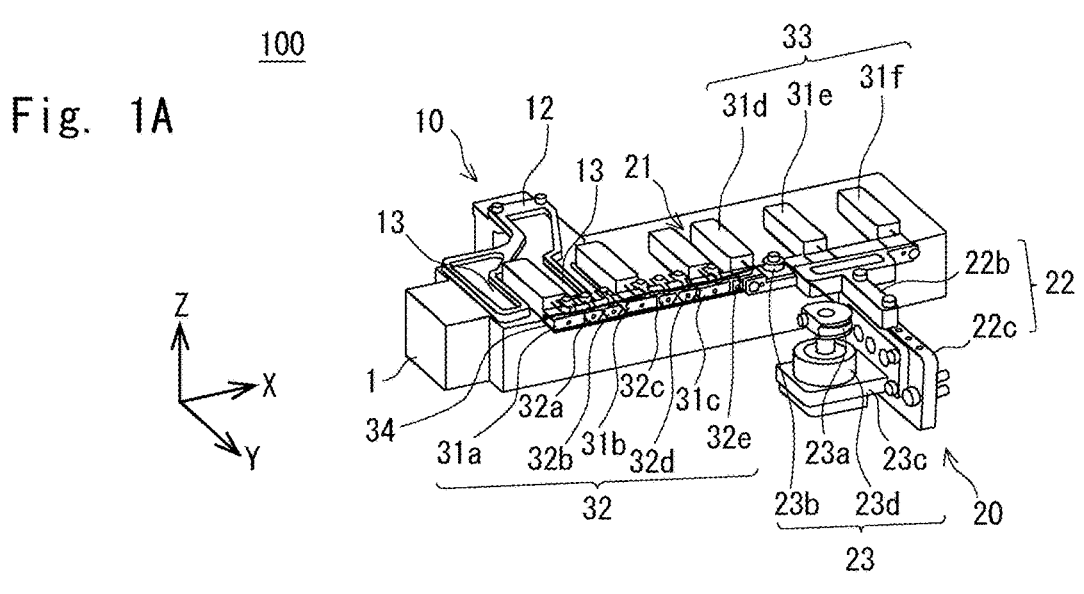
FIG. 1A is a perspective view for explaining a sheet takeout device and an operation of the sheet takeout device in a first embodiment.
Figure 1B:
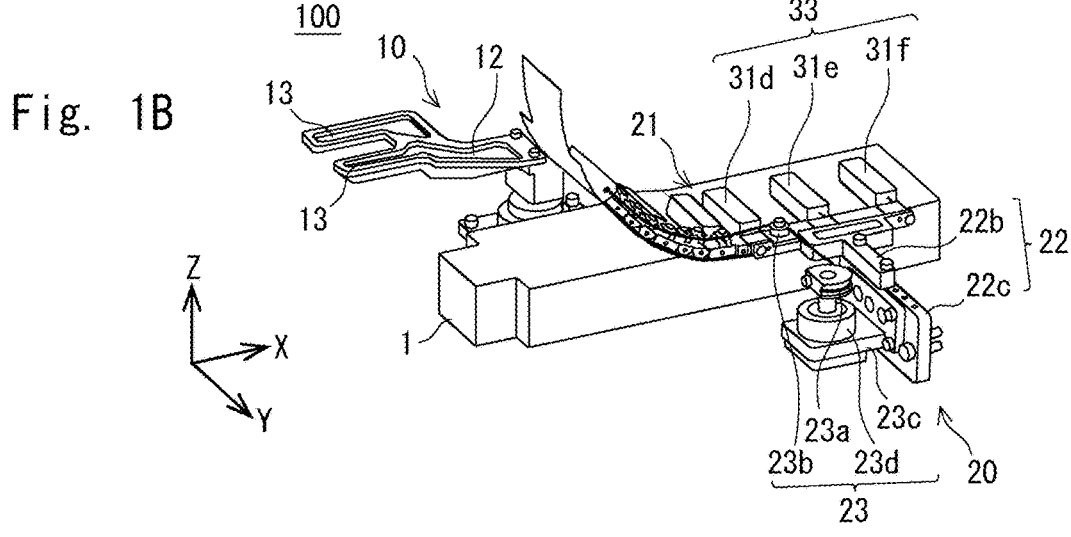
FIG. 1B is a perspective view for explaining the sheet takeout device and the operation of the sheet takeout device in the first embodiment.
Figure 1C:
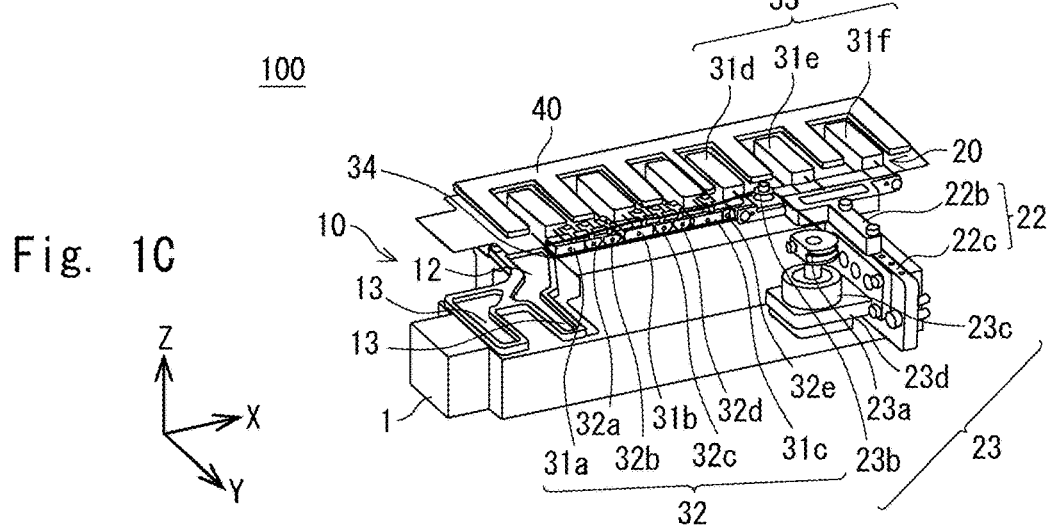
FIG. 1C is a perspective view for explaining the sheet takeout device and the operation of the sheet takeout device in the first embodiment.

First, a sheet takeout device 100 and an operation of the sheet takeout device 100 in the first embodiment will be described with reference to FIGS. 1A to 1C. FIGS. 1A to 1C are perspective views for explaining the sheet takeout device and the operation of the sheet takeout device in the first embodiment.

The sheet takeout device 100 shown in FIGS. 1A to 1C is a device for taking out sheet-shaped electrodes 1 one by one from a magazine in which the sheet-shaped electrodes 1 are stored in a stacked state and transferring the one sheet-shaped electrode 1 that has been taken out to a transfer holder 40 that will be described later.

The sheet-shaped electrode 1 is, for example, a battery material for forming a battery such as an all solid battery to be mounted in a vehicle. The all solid battery is preferably an all solid lithium rechargeable battery. The sheet-shaped electrode 1 has a rectangular plan shape. The thickness of the sheet-shaped electrode 1 is, for example, 0.1 to 0.5 mm.

Hereinafter, the longitudinal direction of the sheet-shaped electrode 1 is defined as the X direction, the short direction orthogonal to the longitudinal direction of the sheet-shaped electrode 1 is defined as the Y direction, and the stacking direction of the sheet-shaped electrode 1 orthogonal to the XY plane is defined as the Z direction.

The plurality of sheet-shaped electrodes 1 stored in the stacked state in the magazine are not necessarily flat in shape, and there are ones of warped shapes and ones of wavy shapes. Therefore, the plurality of sheet-shaped electrodes 1 stored in the stacked state in the magazine are in an unstable state in the magazine. Therefore, unless the sheet takeout device 100 properly takes out the sheet-shaped electrode 1 from the magazine, the sheet-shaped electrodes 1 stacked in the magazine are liable to end up falling down inside the magazine or ending up becoming offset in position inside the magazine.

Therefore, the sheet takeout device 100 in the first embodiment is configured to properly takeout the sheet-shaped electrodes 1 from the magazine and transfer the sheet-shaped electrodes 1 to the transfer holder 40 so that each of the sheet-shaped electrodes 1 stacked in the magazine does not fall down, for example, in the magazine.

The sheet takeout device 100 includes a restraining device 10 provided on one lateral side of the magazine installation part in which the magazine is arranged, which is one side in the Y direction, and a transfer device 20 provided on the other lateral side of the magazine installation part, which is the other side in the Y direction. The detailed configuration of each of these devices will be described below.

The restraining device 10 is a device for restraining the plurality of sheet-shaped electrodes 1 stored in a stacked state in the magazine from an upper side of the stacking direction, which is the upper side of the Z direction, so that these sheet-shaped electrodes 1 do not tip over. The restraining device 10 includes a blade drive part and a restraining blade 12.

The blade drive part is installed so that the axial direction of its output axis is parallel to the height direction, that is, the Z direction of the magazine. The blade drive part is configured so that the restraining blade 12 can be moved in the up-down direction (Z direction) along the axial direction of its output axis and the restraining blade 12 can be rotated in both directions about the axis of the output axis.

The restraining blade 12 is a plate-shaped member. The restraining blade 12 has its base end fixed to the front end of the output axis of the blade drive part so that it can rotate with the output axis of the blade drive part. A restraining part 13 is formed at the front end side of the restraining blade 12. The restraining part 13 is shaped to mesh with the comb teeth formed in the elastic deformation part 32 of the transfer plate 21 when facing the transfer plate 21 described later in the horizontal plane (XY plane).

FIG. 1A shows the restrained state of the restraining device 10 which restrains the sheet-shaped electrodes 1 stacked in the magazine from the upper side of the Z direction by the restraining part 13 of the restraining blade 12. FIG. 1B shows the non-restrained state of the restraining device 10 which is obtained by retracting the restraining part 13 of the restraining blade 12 from the sheet-shaped electrode 1 by rotating the output axis of the blade drive part clockwise by about 45 degrees from the restrained state of FIG. 1A to release the restraining blade 12 from restraining the sheet-shaped electrode 1. FIG. 1C shows the restrained state of the restraining device 10 which is obtained by restraining the sheet-shaped electrodes 1 stacked in the magazine from the upper side of the Z direction by the restraining part 13 after the restraining blade 12 is inserted into the space formed between the topmost sheet-shaped electrode 1 and a sheet-shaped electrode 1 provided below the topmost sheet-shaped electrode 1 by rotating the output axis of the blade drive part counterclockwise by about 45 degrees from the non-restrained state of FIG. 1B.

As shown in FIG. 1A and FIG. 1C, the restraining part 13 of the restraining blade 12 is formed on the front end side of the restraining blade 12 so as to be placed on one end side of the sheet-shaped electrodes 1 stacked in the magazine in the X direction above the sheet-shaped electrode 1 in the restrained state.

The transfer device 20 is a device for taking out the topmost one of the sheet-shaped electrodes 1 stacked in the magazine and transferring the sheet-shaped electrode 1 that has been taken out to a receiving holder 40 of a conveyance device described later. The transfer device 20 is provided with a transfer plate 21, a plate advancing/retracting mechanism 22 for adjusting the advancing and retracting of the transfer plate 21, and a plate deformation mechanism 23 for adjusting the deformation of the transfer plate 21.

The transfer plate 21 has a comb tooth shape in which a plurality of recesses are formed as a whole. The transfer plate 21 has pickup and holding parts 31*a* to 31*f* arranged at intervals therebetween in the X direction. The pickup and holding parts 31*a* to 31*f* pickup and hold the topmost one of the sheet-shaped electrodes 1 stacked in the magazine from the upper side of the Z direction. A plurality of pickup ports (not shown) are provided on a surface facing the sheet-shaped electrode 1, which is a rear surface of each of the pickup and holding parts 31*a* to 31*f*, so that the sheet-shaped electrode 1 can be picked up and held by vacuum. The transfer plate 21 has an elastic deformation part 32 elastically deformable on one end side in the X direction and an inelastic deformation part 33 not elastically deformable on the other end side in the X direction.

The elastic deformation part 32 has pickup and holding parts 31*a* to 31*c* arranged on one end side in the X direction and block bodies 32*a* to 32*e*. Block bodies 32*a* and 32*b* are arranged between the pickup and holding parts 31*a* and 31*b*, and block bodies 32*a* and 32*b* are arranged between the pickup and holding parts 31*b* and 31*c*. A block body 32*e* is arranged between the pickup and holding parts 31*c* and 31*d*. When the transfer plate 21 is in the horizontal state, the pickup and holding parts 31*a* to 31*c* and the block bodies 32*a* to 32*e* of the elastic deformation part 32 are arranged at predetermined intervals therebetween in the X direction.

Each of the base ends and the block bodies 32*a* to 32*e* of the pickup and holding parts 31*a* to 31*c* has a protrusion protruding in one side in the X direction and a recess recessed in one side in the X direction. The pickup and holding parts 31*a* to 31*c* and the block bodies 32*a* to 32*e* adjacent to each other in the X direction are loosely fitted by these protrusions and recesses.

The inelastic deformation part 33 has pickup and holding parts 31*d* to 31*f* arranged on the other end side in the X direction. The inelastic deformation part 33 is supported by the plate advancing/retracting mechanism 22. The pickup and holding parts 31*d* to 31*f* of the inelastic deformation part 33 are integrally coupled at a base end supported by the plate advancing/retracting mechanism 22.

The elastic deformation part 32 and the inelastic deformation part 33 arranged adjacent to each other in the X direction are coupled to each other by an elastic plate 34 that is extended in the X direction and is provided on a rear surface of each of the base end of the pickup and holding parts 31*a* to 31*f* and the block bodies 32*a* to 32*e*, the rear surface being a surface facing the sheet-shaped electrode 1. The elastic plate 34 is a thin plate-shaped member formed of spring steel or the like.

The plate advancing/retracting mechanism 22 includes a plate advancing/retracting drive unit, a plate supporter 22*b*, and a coupling arm 22*c*. The plate advancing/retracting drive unit is installed such that the axial direction of its output axis is parallel to the Z direction. The plate supporter 22*b* is attached to the front end of the output axis of the plate advancing/retracting drive unit through a coupling arm 22*c*. The plate advancing/retracting drive unit is configured such that the plate supporter 22*b* can be moved in an up-down direction (Z direction) along the axial direction of its output axis. The plate supporter 22*b* supports the transfer plate 21 by holding it. The front end side of the plate supporter 22*b* is fixed to the base end of the inelastic deformation part 33. The base end of the plate supporter 22*b* is fixed to the coupling arm 22*c*. The coupling arm 22*c* is a rod-like member for coupling the output axis of the plate advancing/retracting drive unit to the transfer plate 21.

The plate deformation mechanism 23 includes a wire member 23*a*, a pulley 23*b*, a tension mechanism supporter 23*c*, and a tension mechanism 23*d*. The wire member 23*a* extends from the tension mechanism 23*d* through the pulley 23*b* to the pickup and holding part 31*a*. The front end of wire member 23*a* is attached to the pickup and holding part 31*a* located on the elastic deformation part 32 which is opposite to the inelastic deformation part 33. The pulley 23*b* is attached to the inelastic deformation part 33. The pulley 23*b* may be attached to the plate supporter 22*b*. The pulley 23*b* changes the orientation of the wire member 23*a*. The tension mechanism supporter 23*c* is attached to the front end of the output axis of the plate advancing/retracting drive unit through the coupling arm 22*c*. The tension mechanism supporter 23*c* is a generally L-shaped plate-shaped member that holds and supports tension mechanism 23*d*. The base end of the tension mechanism supporter 23*c* is fixed to the coupling arm 22*c*.

The tension mechanism 23*d* is fixed to the coupling arm 22*c* through the tension mechanism supporter 23*c*. The tension mechanism 23*d* winds the wire member 23*a* to apply a tensile force on the wire member 23*a*. The tension mechanism 23*d* includes a reel around which the wire member 23*a* is wound and a drive source which rotates the reel. The drive source rotates the reel so that the reel winds the wire member 23*a*. Accordingly, the plate deformation mechanism 23 lifts the pickup and holding part 31*a* to pull it upward, and elastically deforms the elastic deformation part 32. The tension mechanism 23*d* is a tension mechanism which applies a tensile force to the wire member 23*a* whose front end is attached to the pickup and holding part 31*a* located in the elastic deformation part 32 which is opposite to the inelastic deformation part 33.

FIG. 1A shows the horizontal state of the transfer plate 21 in which the transfer plate 21 on the sheet-shaped electrodes 1 stacked in the magazine is placed in the horizontal state as it is not elastically deformed. FIG. 1B shows an elastically deformed state of the transfer plate 21 in which the elastic deformation part 32 is elastically deformed to bend upward from the horizontal state of FIG. 1A, thereby inclining the elastic deformation part 32 in the horizontal direction. At one end side of the transfer plate 21 in the longitudinal direction parallel to the X direction, the elastic deformation part 32 of the transfer plate 21 in the elastically deformed state causes the tilted part of the topmost sheet-shaped electrode 1 that has been picked up and held to incline in the horizontal direction. At the other end side of the transfer plate 21 in the longitudinal direction, the inelastic deformation part 33 of the transfer plate 21 in the elastically deformed state restrains the restrained part of the topmost sheet-shaped electrode 1 that has been picked up and held from the upper side of the Z direction. FIG. 1C shows the transfer device 20 raised from the elastically deformed state of FIG. 1B to the position where the sheet-shaped electrode 1 picked up and held by the transfer plate 21 is transferred while returning the transfer plate 21 to the horizontal state.

The conveyance device is provided above the restraining device 10 and the transfer device 20. The conveyance device receives the sheet-shaped electrode 1 picked up and held by the transfer plate 21 of the transfer device 20 from the transfer plate 21 in the receiving position, and conveys the received sheet-shaped electrode 1 to the placement position. The conveyance device is provided with a receiving holder 40 that receives the sheet-shaped electrode 1 picked up and held by the transfer plate 21 from the transfer plate 21.

The receiving holder 40 can pick up and hold the sheet-shaped electrode 1 picked up and held by the transfer plate 21 from the upper side, similarly to the transfer plate 21. The receiving holder 40 is configured to be movable along the longitudinal direction of the receiving holder 40 parallel to the X direction at least in the horizontal plane. The receiving holder 40 is a plate-shaped member of a comb tooth shape that meshes with the comb teeth formed on the transfer plate 21 when facing the transfer plate 21 in the horizontal plane. A plurality of pickup ports (not shown) are provided on a surface facing the sheet-shaped electrode 1, which is a rear surface of the receiving holder 40 so that the sheet-shaped electrode 1 can be picked up and held by vacuum, like in the transfer plate 21.

Next, a sheet takeout method of the sheet-shaped electrode 1 by the sheet takeout device 100 described above will be described with reference to FIGS. 2A to 2H. FIGS. 2A to 2H are front views illustrating the sheet takeout method performed by the sheet takeout device in the first embodiment. FIGS. 2A to 2H are front views illustrating the sheet-shaped electrodes 1 stacked in the magazine, the restraining blade 12, and the transfer plate 21 viewed from the other side in the Y direction.

Figure 2A:
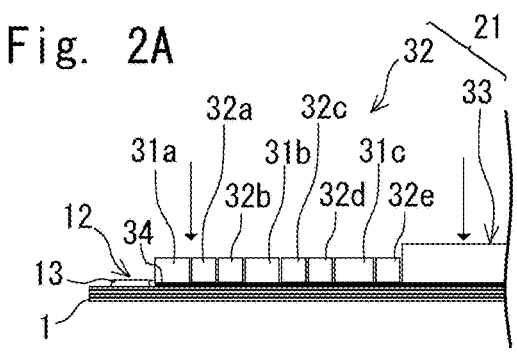
FIG. 2A is a front view for explaining a sheet takeout method performed by the sheet takeout device in the first embodiment.

FIG. 2A shows a restrained state in which the sheet-shaped electrodes 1 stacked in the magazine are restrained from the upper side of the Z direction by the restraining part 13 of the restraining blade 12. In this restrained state, the transfer plate 21 is lowered from the upper side of the sheet-shaped electrode 1 while maintaining the horizontal state by the plate advancing/retracting mechanism 22 and the plate deformation mechanism 23. That is, the transfer plate 21 is advanced so as to approach the sheet-shaped electrodes 1 stacked in the magazine while maintaining the horizontal state. As a result, the topmost one of the sheet-shaped electrodes 1 stacked in the magazine by the transfer plate 21 is restrained while being picked up and held.

Figure 2E:
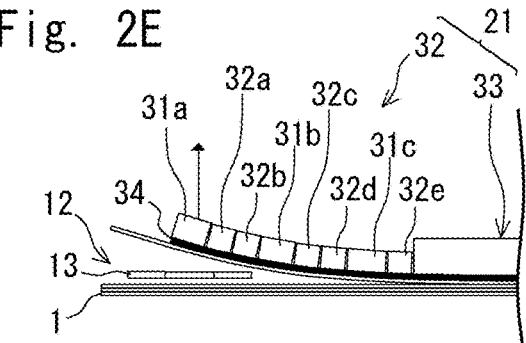
FIG. 2E is a front view for explaining the sheet takeout method performed by the sheet takeout device in the first embodiment.
Figure 2B:
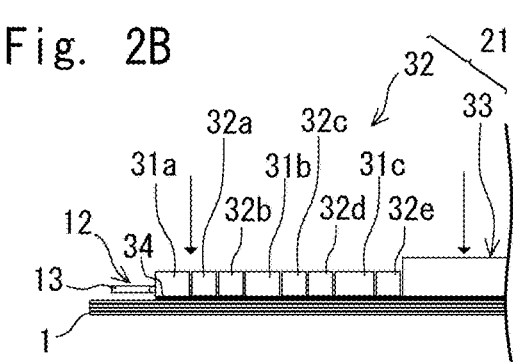
FIG. 2B is a front view for explaining the sheet takeout method performed by the sheet takeout device in the first embodiment.

From the state shown in FIG. 2A, the restraining blade 12 of the restraining device 10 is moved upward to the state shown in FIG. 2B. When the state shown in FIG. 2B is achieved, the restraining blade 12 of the restraining device 10 is rotated clockwise by about 45 degrees, as shown in FIG. 2C, so that the restraining part 13 of the restraining blade 12 is retracted from the sheet-shaped electrode 1.

Figure 2F:
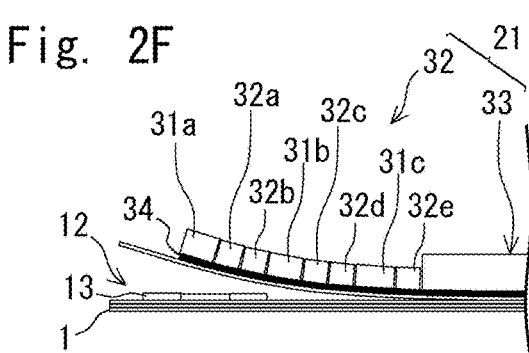
FIG. 2F is a front view for explaining the sheet takeout method performed by the sheet takeout device in the first embodiment.
Figure 2C:
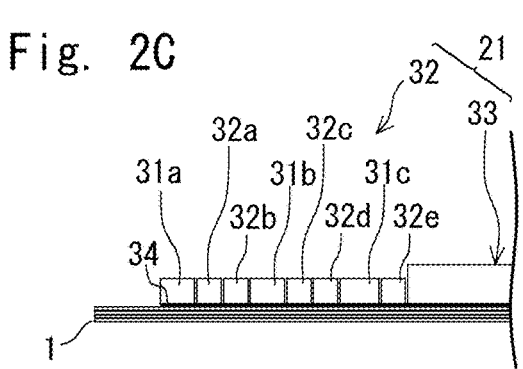
FIG. 2C is a front view for explaining the sheet takeout method performed by the sheet takeout device in the first embodiment.
Figure 2G:
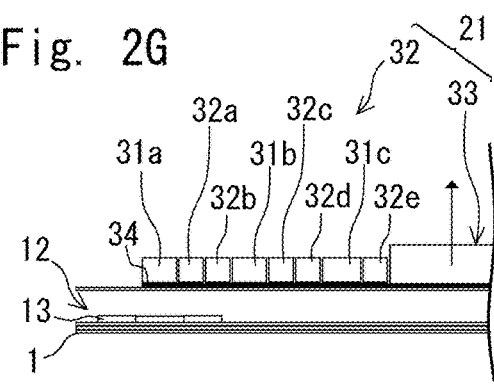
FIG. 2G is a front view explaining the sheet takeout method performed by the sheet takeout device in the first embodiment.
Figure 2D:
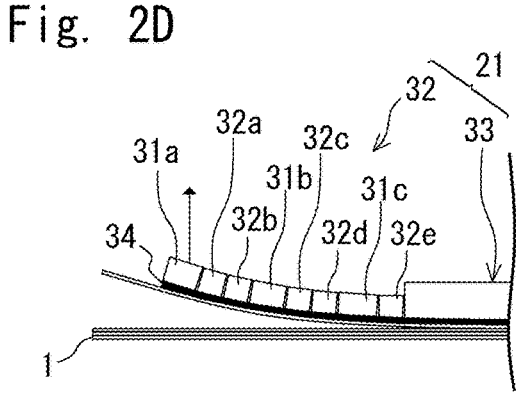
FIG. 2D is a front view for explaining the sheet takeout method performed by the sheet takeout device in the first embodiment.

When the state shown in FIG. 2C is achieved, then the elastic deformation part 32 of the transfer plate 21 is brought into the elastically deformed state by the plate deformation mechanism 23, as shown in FIG. 2D. As a result, the tilted part of the topmost sheet-shaped electrode 1 on one end side in the X direction is brought into the state of being lifted upward. At this time, the restrained part of the topmost sheet-shaped electrode 1 on the other end side in the X direction is brought into the state of being restrained by the inelastic deformation part 33 of the transfer plate 21.

Once in the state shown in FIG. 2D, next, the restraining blade 12 of the restraining device 10 is counter-clockwise rotated by about 45 degrees and inserted into the space formed between the topmost sheet-shaped electrode 1 and a sheet-shaped electrode 1 provided below the topmost sheet-shaped electrode 1, as shown in FIG. 2E. Once in the state shown in FIG. 2E, the restraining blade 12 of the restraining device 10 is moved downward and the restraining part 13 of the restraining blade 12 is returned to the restrained state, as shown in FIG. 2F. As a result, each of the stacked sheet-shaped electrodes 1 below the topmost sheet-shaped electrode 1 picked up and held by the transfer plate 21 is restrained from the upper side of the Z direction by the restraining part 13 of the restraining blade 12.

Figure 2H:
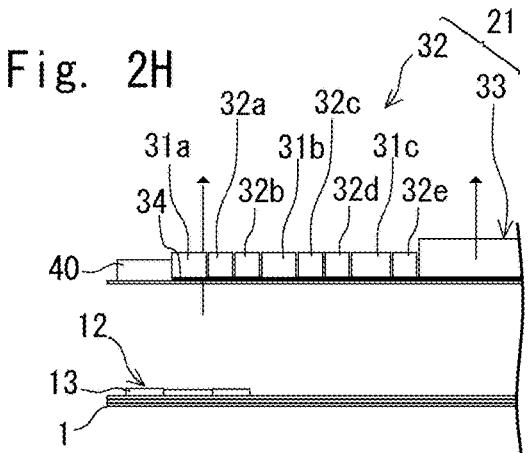
FIG. 2H is a front view explaining the sheet takeout method performed by the sheet takeout device in the first embodiment.

Once in the state shown in FIG. 2F, the transfer plate 21 is returned to the horizontal state while being raised by the plate advancing/retracting mechanism 22, as shown in FIG. 2G. That is, the transfer plate 21 is returned to the horizontal state while being retracted away from the sheet-shaped electrodes 1 stacked in the magazine. As a result, the topmost sheet-shaped electrode 1 picked up and held by the transfer plate 21 is taken out. Then, as shown in FIG. 2H, the transfer plate 21 is further raised (retracted) to a position facing the receiving holder 40 by the plate advancing/retracting mechanism 22 and the plate deformation mechanism 23. Then, the sheet-shaped electrode 1 is transferred from the transfer plate 21 to the receiving holder 40.

As shown in FIGS. 2A to 2G, in this embodiment, each of the sheet-shaped electrodes 1 stacked in the magazine is restrained from the upper side of the Z direction by the transfer plate 21 or restraining blade 12 until the topmost sheet-shaped electrode 1 is taken out. As shown in FIGS. 2D to 2F, even while the topmost sheet-shaped electrode 1 picked up and held by the transfer plate 21 in the elastically deformed state is being flipped, each of the sheet-shaped electrodes 1 stacked in the magazine is always restrained from the upper side of the Z direction by the inelastic deformation part 33.

Therefore, it is possible to secure a sufficient space for inserting the restraining blade 12 between the topmost sheet-shaped electrode 1 and a sheet-shaped electrode 1 provided below the topmost sheet-shaped electrode 1 without interference while preventing a ratio of the restrained parts in the topmost sheet-shaped electrode 1 restrained from the upper side of the Z direction from becoming too small. As a result, in the process of taking out the topmost sheet-shaped electrode 1 from the plurality of stacked sheet-shaped electrodes 1, it is possible to prevent the sheet-shaped electrode 1 from falling down or the sheet-shaped electrode 1 from becoming offset in position by restraining the plurality of sheet-shaped electrodes 1 from the upper side of the Z direction.

Here, in order to secure a sufficient space while increasing the ratio of the restrained parts in the topmost sheet-shaped electrode 1 restrained from the upper side of the Z direction, it may be possible to incline the tilted part of the topmost sheet-shaped electrode 1 to a large extent. On the other hand, if the tilted part is inclined to a large extent, a bending R of the sheet-shaped electrode 1 formed by the restrained part that is restrained and the tilted part lifted upward becomes too small, and the sheet-shaped electrode 1 may crack.

Therefore, the transfer plate 21 is configured to prevent the bending R of the sheet-shaped electrode 1 picked up and held by the transfer plate 21 in an elastically deformed state from becoming too small. Specifically, when the transfer plate 21 is switched to the elastically deformed state, the pickup and holding part 31a is lifted upward to elastically deform the elastic plate 34, so that the adjacent block bodies 32a to 32e and the pickup and holding parts 31b and 31c are sequentially lifted in accordance with the deformation of the elastic plate 34. As a result, the elastic deformation part 32 is elastically deformed. When the elastic deformation part 32 is elastically deformed by a predetermined amount, the lifted pickup and holding parts 31a to 31c and the lifted block bodies 32a to 32e come into contact with each other, so that the elastic deformation part 32 does not deform elastically by a predetermined amount or more.

Thus, since the elastic deformation part 32 does not deform elastically by a predetermined amount or more, the transfer plate 21 prevents the bending R of the sheet-shaped electrode 1 picked up and held by the transfer plate 21 in the elastically deformed state from becoming too small. Thus, cracking of the sheet-shaped electrode 1 can be suppressed.

Figure 3:
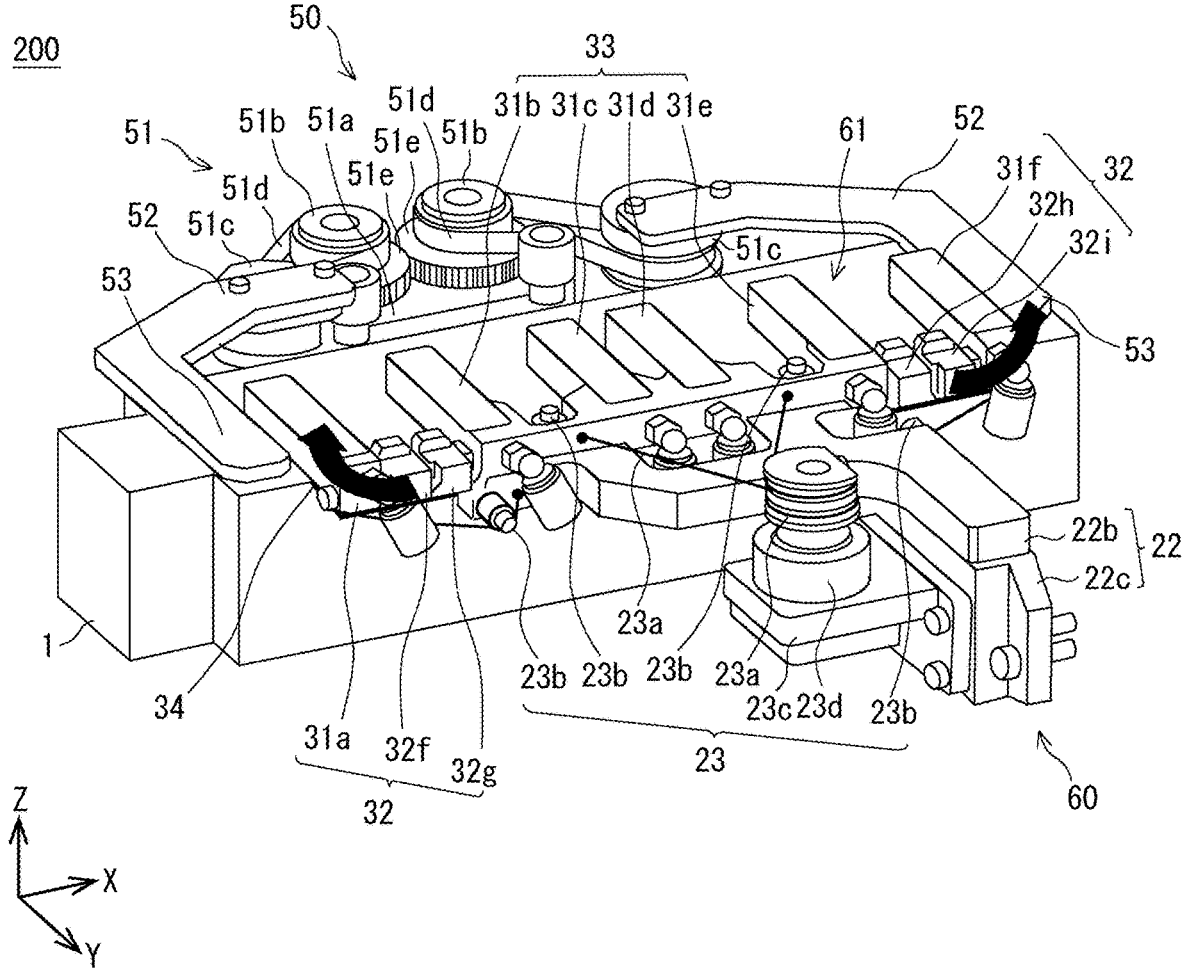
FIG. 3 is a perspective view explaining a modified example of the sheet takeout device in the first embodiment.

In the sheet takeout device 100 described above, the elastic deformation part 32 is arranged on one end side of the transfer plate 21 in the X direction, but a pair of elastic deformation parts 32 may be arranged on both end sides in the X direction. FIG. 3 is a perspective view for explaining a modified example of the sheet takeout device in the first embodiment. With reference to FIG. 3, a sheet takeout device 200 will be described as a modified example of the sheet takeout device in the first embodiment.

The sheet takeout device 200 shown in FIG. 3 includes a restraining device 50 and a transfer device 60. The restraining device 50 includes a blade drive mechanism 51 and a pair of restraining blades 52 each having a restraining part 53 formed on the front end side thereof. The blade drive mechanism 51 includes a blade drive part, a pulley supporter 51a, a pair of driving pulleys 51b, a pair of driven pulleys 51c, and a pair of belts 51d.

The blade drive part is installed so that the axial direction of its output axis becomes parallel to the Z direction. The blade drive part is arranged so that the pulley supporter 51a can be moved in the up-down direction (Z direction) along the axial direction of its output axis and one driving pulley 51b can be rotated in both directions about the axis of the output axis.

The pulley supporter 51a is a plate-shaped member that rotatably supports each of the pair of driving pulleys 51b and the pair of driven pulleys 51c. The pair of driving pulleys 51b is arranged near the center of the sheet-shaped electrodes 1 stacked in the magazine in the X direction. One driving pulley 51b is attached to the front end of the output axis of the blade drive part and rotates according to the rotation of the output axis. That is, one driving pulley 51b is driven by the blade drive part. The other driving pulley 51b is arranged so that the gear 51e rotating integrally with the other driving pulley 51b meshes with the gear 51e rotating integrally with one driving pulley 51b. When the one driving pulley 51b rotates, the other driving pulley 51b rotates in the reverse direction as the gears 51e mesh with each other. That is, the other driving pulley 51b is driven by the rotation of the one driving pulley 51b. The pair of driven pulleys 51c are arranged on both end sides of the sheet-shaped electrodes 1 stacked in the magazine in the X direction. One belt 51d is stretched between one driving pulley 51b and one driven pulley 51c. The other belt 51d is stretched between the other driving pulley 51b and the other driven pulley 51c.

One restraining blade 52 has its base end fixed to one driven pulley 51c. The other restraining blade 52 has its base end fixed to the other driven pulley 51c.

The restraining part 53 of one restraining blade 52 is a part formed on the front end side of one restraining blade 52 so as to be disposed, in the restrained state, on one end side of the sheet-shaped electrodes 1 stacked in the magazine in the X direction above the sheet-shaped electrode 1. The restraining part 53 of the other restraining blade 52 is a part formed on the front end side of the other restraining blade 52 so as to be disposed, in the restrained state, on the other end side of the sheet-shaped electrodes 1 stacked in the magazine in the X direction above the sheet-shaped electrode 1. Each restraining part 53 has a shape extending in one direction. By transmitting the rotational force of the pair of driving pulleys 51*b* to the pair of driven pulleys 51*c* via the pair of belts 51*d*, the pair of restraining blades 52 rotate in opposite directions to each other.

The transfer device 60 includes a transfer plate 61, a plate advancing/retracting mechanism 22 for adjusting the advancing and retracting of the transfer plate 61, and a plate deformation mechanism 23 for adjusting the deformation of the transfer plate 61. The transfer plate 61 includes a pair of elastic deformation parts 32 that are elastically deformable at both end sides thereof in the X direction, and an inelastic deformation part 33 that is not elastically deformed between the pair of elastic deformation parts 32 at the center thereof in the X direction. One elastic deformation part 32 includes a pickup and holding part 31*a* disposed on one end side of the transfer plate 61 in the longitudinal direction parallel to the X direction, and block bodies 32*f* and 32*g* disposed between the pickup and holding parts 31*a* and 31*b*. The other elastic deformation part 32 includes a pickup and holding part 31*f* disposed on the other end side of the transfer plate 61 in the longitudinal direction and block bodies 32*h* and 32*i* disposed between the pickup and holding parts 31*e* and 31*f*.

The inelastic deformation part 33 includes pickup and holding parts 31*b* to 31*e* disposed at the center of the transfer plate 61 in the longitudinal direction. The inelastic deformation part 33 is supported by a plate advancing/retracting mechanism 22. The pickup and holding parts 31*b* to 31*e* of the inelastic deformation part 33 are integrally coupled at the base end supported by the plate advancing/retracting mechanism 22.

The pickup and holding parts 31*a* and 31*f*, the block bodies 32*f* to 32*i*, and the inelastic deformation part 33 are arranged at predetermined intervals therebetween in the X direction and are coupled to each other by an elastic plate 34 that is provided on a rear surface of each of the base end of the pickup and holding parts 31*a* to 31*f* and the block bodies 32*f* to 32*i*, the rear surface being a surface facing the sheet-shaped electrode 1.

The plate advancing/retracting mechanism 22 includes a plate advancing/retracting drive unit, a plate supporter 22*b*, and a coupling arm 22*c*. The plate deformation mechanism 23 includes a pair of wire members 23*a*, a plurality of pulleys 23*b*, a tension mechanism supporter 23*c*, and a tension mechanism 23*d*. One wire member 23*a* extends from the tension mechanism 23*d* through two pulleys 23*b* to the pickup and holding part 31*a*, and the front end is attached to the pickup and holding part 31*a*. The other wire member 23*a* extends from the tension mechanism 23*d* through other two pulleys 23*b* to the pickup and holding part 31*f*, and the front end is attached to the pickup and holding part 31*f*. The plate deformation mechanism 23 lifts the pickup and holding parts 31*a* and 31*f* upward to elastically deform the pair of elastic deformation parts 32.

When the transfer plate 61 on the sheet-shaped electrodes 1 stacked in the magazine is elastically deformed from the horizontal state so that the pair of elastic deformation parts 32 deflect upward, the transfer device 60 becomes an elastically deformed state in which the pair of elastic deformation parts 32 are inclined with respect to the horizontal direction. At both end sides of the transfer plate 61 in the longitudinal direction, the elastic deformation part 32 of the transfer plate 61 in the elastically deformed state causes the tilted part of the topmost sheet-shaped electrode 1 to incline in the horizontal direction. At the center of the transfer plate

61 in the longitudinal direction, the inelastic deformation part 33 of the transfer plate 61 in the elastically deformed state restrains the restrained part of the topmost sheet-shaped electrode 1 from the upper side of the Z direction.

Here, when the sheet takeout device 100 shown in FIGS. 1A to 1C is used, the position of the center of gravity of the restraining force caused by the restraining part 13 of the restraining device 10 and the position of the center of gravity of the restraining force caused by the inelastic deformation part 33 of the transfer device 20 for each of the stacked sheet-shaped electrodes 1 are deviated from the center position of the topmost sheet-shaped electrode 1. Since the sheet-shaped electrode 1 of the lower layer is in the restrained state through the sheet-shaped electrode 1 of the upper layer, the position of the center of gravity of the restraining force applied to the sheet-shaped electrode 1 of the lower layer is also deviated from the center position. Therefore, in the sheet takeout method performed by the sheet takeout device 100, if the restraining of the restraining device 10 by the restraining part 13 and the restraining of the transfer device 20 by the inelastic deformation part 33 are alternately repeated in the process of sequentially taking out the topmost sheet-shaped electrode 1 from a plurality of stacked sheet-shaped electrodes 1, the position of each of the sheet-shaped electrodes 1 stacked in the magazine may be gradually offset.

On the other hand, in the case of using the sheet takeout device 200 shown in FIG. 3, the position of the center of gravity of the restraining force by the restraining part 53 of the restraining device 50 and the position of the center of gravity of the restraining force by the inelastic deformation part 33 of the transfer device 60 for each of the stacked sheet-shaped electrodes 1 coincide with the center position of the topmost sheet-shaped electrode 1. Since the sheet-shaped electrode 1 of the lower layer is in the restrained state through the sheet-shaped electrode 1 of the upper layer, the position of the center of gravity of the restraining force applied to the sheet-shaped electrode 1 of the lower layer also coincides with the center position. Therefore, in the sheet takeout method performed by the sheet takeout device 200, even if the restraining by the restraining part 53 of the restraining device 50 and the restraining by the inelastic deformation part 33 of the transfer device 60 are alternately repeated in the process of sequentially taking out the topmost sheet-shaped electrode 1 from the plurality of stacked sheet-shaped electrodes 1, the position offset of each of the sheet-shaped electrodes 1 stacked in the magazine is suppressed.

According to this embodiment described above, the sheet takeout devices 100 and 200 which take out the topmost sheet-shaped electrode 1 from a plurality of sheet-shaped electrodes 1 (sheet members) horizontally placed in the magazine installation part (placement station) in a pre-stacked state include a restraining device 10 or 50 (restraint device) and a transfer device 20 or 60.

The restraining devices 10 and 50 have restraining blades 12 and 52 which restrain a plurality of sheet-shaped electrodes 1 from the upper side of the Z direction, are arranged on a side of the magazine installation part, and are configured to be switchable between a restrained state in which the plurality of sheet-shaped electrodes 1 are restrained by the restraining blades 12 and 52 from the upper side of the Z direction and a non-restrained state in which the restraining blades 12 and 52 are retracted from the plurality of sheet-shaped electrodes 1 and the restraint by the restraining blades 12 and 52 is released. The transfer devices 20 and 60 have a transfer plate 61 including pickup and holding parts 31*a* to 31*f* (a plurality of pickup and holding parts) for picking up and holding the topmost sheet-shaped electrode 1 from the upper side of the plurality of sheet-shaped electrodes 1 in the Z direction, and are arranged so as to be opposed to the restraining devices 10 and 50 in the short direction of the sheet-shaped electrode 1 with the magazine installation part interposed therebetween, and the transfer plates 21 and 61 are arranged so as to be switchable between a horizontal state where the transfer plates 21 and 61 are opposed to the topmost sheet-shaped electrode 1 so as to be parallel thereto and an elastically deformed state in which the elastically deformable elastic deformation part 32 including the pickup and holding part 31*a* arranged on one end side of the sheet-shaped electrode 1 in the longitudinal direction orthogonal to the short direction or the pickup and holding parts 31*a* and 31*f* arranged on both end sides of the sheet-shaped electrode 1 in the longitudinal direction is elastically deformed so that it is deflected upward.

The sheet takeout method performed by the sheet takeout devices 100 and 200 includes a first process to a fifth process. In the first process, when the restraining devices 10 and 50 are in the restrained state, the transfer plates 21 and 61 that are in the horizontal state are pressed against the topmost sheet-shaped electrode 1 from the upper side of the stacking direction (upper side of the Z direction) of the plurality of sheet-shaped electrodes 1 to pick up and hold the topmost sheet-shaped electrode 1. In the second process, after the first process, the plurality of sheet-shaped electrodes 1 are pressed from the upper side of the Z direction by the inelastic deformation part 33 of the transfer plates 21 and 61 in the elastically deformed state while setting the restraining devices 10 and 50 to be in the non-restrained state and setting the transfer plates 21 and 61 to be in the elastically deformed state. In the third process, after the second process, the restraining blades 12 and 52 are inserted into the space formed between the topmost sheet-shaped electrode 1 and a sheet-shaped electrode 1 provided below the topmost sheet-shaped electrode 1 by setting the transfer plates 21 and 61 to be in the elastically deformed state in the second process, and the restraining devices 10 and 50 are put into the restrained state again. In the fourth process, after the third process, the transfer plates 21 and 61 that pick up and hold the topmost sheet-shaped electrode 1 are retracted upward and returned to the horizontal state. In the fifth process, after the fourth process, the topmost sheet-shaped electrode 1 that picks up and holds the transfer plates 21 and 61 is transferred to the receiving holder 40.

As a result, by the timing when the transfer plates 21 and 61 that pick up and hold the topmost sheet-shaped electrode 1 are retracted upward in the first process to the fourth process, each of the sheet-shaped electrodes 1 stacked in the magazine is always restrained by the restraining blades 12 and 52 or the transfer plates 21 and 61 from the upper side of the Z direction. Furthermore, even while the transfer plates 21 and 61 are in the elastically deformed state during the period from the second process to the third process, each of the sheet-shaped electrodes 1 stacked in the magazine is always restrained by the inelastic deformation part 33 from the upper side of the Z direction.

Therefore, the ratio of the restrained parts to the topmost sheet-shaped electrode 1 restrained from the upper side of the Z direction does not become too small, and a sufficient space for inserting the restraining blades 12 and 52 between the topmost sheet-shaped electrode 1 and the underlying sheet-shaped electrode 1 without interference can be secured. As a result, it is possible to prevent the sheet-shaped electrode 1 from falling down and the sheet-shaped electrode 1 from becoming offset in position by restraining the plurality of sheet-shaped electrodes 1 from the upper side of the Z direction in the process of taking out the topmost sheet-shaped electrode 1 from the plurality of stacked sheet-shaped electrodes 1.

Second Embodiment

Figure 4:
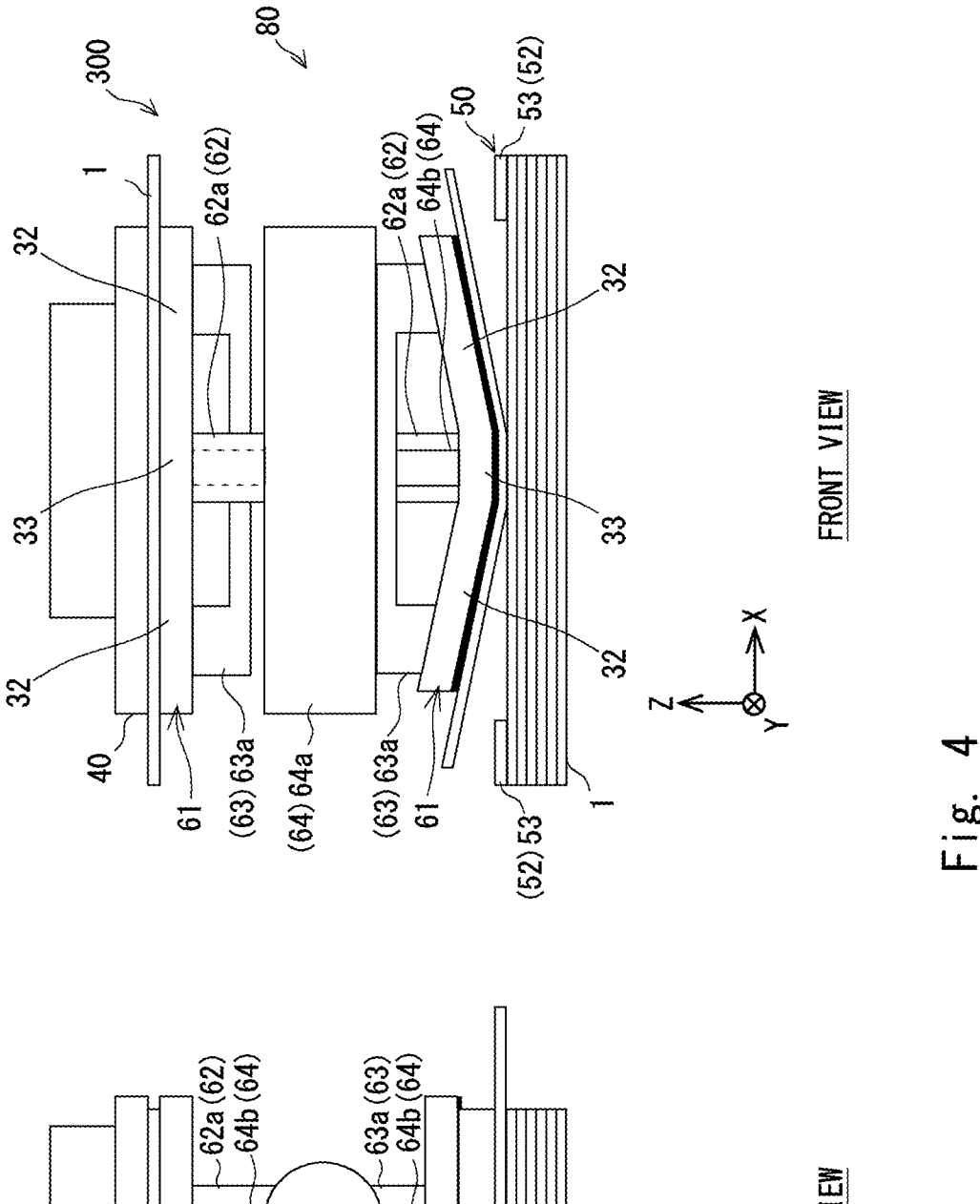
FIG. 4 is a side view and a front view explaining a sheet takeout device in a second embodiment.

A sheet takeout device 300 in a second embodiment will be described with reference to FIG. 4. FIG. 4 is a side view and a front view for explaining a sheet takeout device in the second embodiment. The left side of FIG. 4 shows a side view of the sheet takeout device 300 viewed from one side in the X direction. The right side of FIG. 4 shows a front view of the sheet takeout device 300 viewed from one side in the Y direction.

As shown in FIG. 4, the sheet takeout device 300 includes a restraining device 50 and a transfer device 80. The restraining device 50 is similar to that shown in FIG. 3 and includes a pair of restraining blades 52 each having a restraining part 53 formed on the front end side thereof.

The transfer device 80 includes a pair of transfer plates 61, a plate advancing/retracting mechanism 62 for adjusting the advancing and retracting of the pair of transfer plates 61, a plate deformation mechanism 63 for adjusting the deformation of the pair of transfer plates 61, and a plate switch mechanism 64 for switching the pair of transfer plates 61. The transfer plate 61 is similar to that shown in FIG. 3 and includes a pair of elastic deformation parts 32 that are elastically deformable on both end sides thereof in the X direction and an inelastic deformation part 33 that is not elastically deformed between the pair of elastic deformation parts 32 at the center thereof in the X direction.

The plate advancing/retracting mechanism 62 includes a rotating disk, a drive source for rotating the rotating disk, a pair of first holding members 62*a*, and a pair of first cam mechanisms. The rotating disk rotates circumferentially about a rotational axis 64*a* that extends parallel to the X direction by the power of the drive source. A pair of transfer plates 61 are coupled to the rotating disk through the pair of first holding members 62*a* and the pair of first cam mechanisms. The first holding member 62*a* is a plate-shaped member that holds the transfer plate 61. An inelastic deformation part 33 is coupled to the front end of the first holding member 62*a*. The first cam mechanism converts the rotational operation of the rotating disk into the operation of advancing and retracting the transfer plate 61 held by the first holding member 62*a*. The first cam mechanism is a cam mechanism that converts the power of the drive source into the operation of advancing and retracting the first transfer plate 61. The plate advancing/retracting mechanism 62 moves the pair of transfer plates 61 held by the pair of first holding members 62*a* by the rotation of the rotating disk along the radial direction of the rotating disk.

The plate deformation mechanism 63 includes the aforementioned rotating disk, a pair of second holding members 63*a*, and a pair of second cam mechanisms. The pair of transfer plates 61 is coupled to the rotating disk via the pair of second holding members 63*a* and the pair of second cam mechanisms. The second holding member 63*a* is a plate-shaped member that holds the transfer plate 61. The pickup and holding parts 31*a* and 31*f* of the pair of elastic deformation parts 32 are coupled to both end sides of the second holding member 63*a*. The second cam mechanism converts the rotational operation of the rotating disk into the operation of advancing and retracting the pickup and holding parts 31*a* and 31*f* of the transfer plate 61 held by the second holding member 63a. The second cam mechanism is a cam mechanism that converts the power of the drive source into the operation of advancing and retracting the pickup and holding parts 31a and 31f located in the elastic deformation part 32 which is opposite to the inelastic deformation part 33. The plate deformation mechanism 63 moves the pickup and holding parts 31a and 31f coupled to the pair of second holding members 63a by the rotation of the rotating disk along the radial direction of the rotating disk.

The transfer device 80 is configured to be switchable between a first takeout state and a second takeout state. The first takeout state is a state in which, while the first process, the second process, the third process, and the fourth process are performed by the one transfer plate 61, the fifth process is performed by the other transfer plate 61. The second takeout state is a state in which, while the first process, the second process, the third process, and the fourth process are performed by the other transfer plate 61, the fifth process is performed by the one transfer plate 61.

The plate switch mechanism 64 includes a rotational axis 64a, a drive source for rotating the rotational axis 64a, and a coupling member 64b. The coupling member 64b is coupled to the rotational axis 64a. The coupling member 64b is a plate-shaped member for coupling the pair of transfer plates 61 to the rotational axis 64a via the pair of first holding members 62a and the pair of second holding members 63a. The coupling member 64b is disposed between the pair of first holding members 62a and the pair of second holding members 63a. The plate switch mechanism 64 moves the pair of transfer plates 61 circumferentially around the rotational axis 64a by rotating the rotational axis 64a, thereby switching the upper and lower positions of the pair of transfer plates 61.

Next, a sheet takeout method of the sheet-shaped electrode 1 by the sheet takeout device 300 described above will be described with reference to FIGS. 5A to 5H. FIGS. 5A to 5H are side views and front views for explaining the sheet takeout method performed by the sheet takeout device according to the second embodiment. As in FIG. 4, a side view of the sheet takeout device 300 viewed from one side in the X direction is shown on the left side of each of FIGS. 5A to 5H. A front view of the sheet takeout device 300 viewed from one side in the Y direction is shown on the right side of each of FIGS. 5A to 5H.

Hereinafter, in order to clarify the positional relationship of the pair of transfer plates 61, one of the pair of transfer plates 61 is denoted as a transfer plate 611 and the other one of the pair of transfer plates 61 is denoted as a transfer plate 612. One of the pair of first holding members 62a is denoted as a first holding member 621, and the other one of the pair of first holding members 62a is denoted as a first holding member 622. Further, one of the pair of second holding members 63a is denoted as a second holding member 631 and the other one of the pair of second holding members 63a is denoted as a second holding member 632. In FIGS. 5A to 5H, illustration of the coupling member 64b and the like is omitted.

First, the transfer device 80 in the first takeout state performs the fifth process by the transfer plate 612 while the first process, second process, third process, and fourth process are performed by the transfer plate 611, as shown in FIGS. 5A to 5F.

FIG. 5A shows the restrained state of the restraining device 50 in which the sheet-shaped electrodes 1 stacked in the magazine is restrained from the upper side of the Z direction by the restraining part 53 of the restraining blade 52. In this restrained state, the transfer device 80 in the first takeout state is in a state in which the transfer plate 611 from which the sheet-shaped electrode 1 is to be taken out retracts away from the sheet-shaped electrodes 1 stacked in the magazine while keeping the horizontal state by the plate advancing/retracting mechanism 62 and the plate deformation mechanism 63. At the same time, the transfer plate 612 from which the sheet-shaped electrode 1 already taken out is picked up and held retracts away from the receiving holder 40 while keeping the horizontal state by the plate advancing/retracting mechanism 62 and the plate deformation mechanism 63.

From the state shown in FIG. 5A, the transfer plate 611, together with the first holding member 621 and the second holding member 631, is advanced to approach the sheet-shaped electrodes 1 stacked in the magazine while keeping the horizontal state by the plate advancing/retracting mechanism 62 and the plate deformation mechanism 63. At the same time, the transfer plate 612, together with the first holding member 622 and the second holding member 632, is advanced to approach the receiving holder 40 while maintaining the horizontal state by the plate advancing/retracting mechanism 62 and the plate deformation mechanism 63. As a result, the topmost one of the sheet-shaped electrodes 1 stacked in the magazine is restrained by the restraining part 53 and the transfer plate 611 from the upper side of the Z direction.

Then, after the pair of restraining blades 52 of the restraining device 50 are moved upward, one restraining blade 52 is rotated counterclockwise by about 45 degrees and the other restraining blade 52 is rotated clockwise by about 45 degrees, so that the restraining part 53 of the restraining blade 52 is retracted from the sheet-shaped electrodes 1 stacked in the magazine, whereby the state shown in FIG. 5B is achieved. As a result, while the topmost one of the sheet-shaped electrodes 1 stacked in the magazine is restrained by the respective restraining parts 53 of the pair of restraining blades 52 or the transfer plate 611 from the upper side of the Z direction, the sheet-shaped electrode 1 picked up and held by the transfer plate 612 is transferred to the receiving holder 40, as shown in FIG. 5B.

Next, after the state shown in FIG. 5B, as shown in FIG. 5C, the pair of elastic deformation parts 32 of the transfer plate 611 are brought into an elastically deformed state as the second holding member 631 is retracted by the plate deformation mechanism 63. As a result, both end sides of the sheet-shaped electrode 1 in the X direction are brought into the state of being lifted upward. At this time, the center of the sheet-shaped electrode 1 in the X direction is restrained by the inelastic deformation part 33 of the transfer plate 611 from the upper side of the Z direction.

When the state shown in FIG. 5C is achieved, the pair of restraining blades 52 of the restraining device 50 are then reversely rotated by about 45 degrees, with one restraining blade 52 clockwise and the other restraining blade 52 counterclockwise, as shown in FIG. 5D. As a result, the pair of restraining blades 52 are inserted into the space formed between the topmost sheet-shaped electrode 1 and a sheet-shaped electrode 1 provided below the topmost sheet-shaped electrode 1. When the state shown in FIG. 5D is achieved, as shown in FIG. 5E, the pair of restraining blades 52 of the restraining device 50 are moved downward, and the restraining device 50 is returned to the restrained state. As a result, each of the stacked sheet-shaped electrodes 1 below the topmost sheet-shaped electrode 1 picked up and held by the transfer plate 611 is restrained by the respective restraining parts 53 of the pair of restraining blades 52 from the upper side of the Z direction.

When the state shown in FIG. 5E is achieved, the transfer plate 611, together with the first holding member 621 and the second holding member 631, is returned to the horizontal state while being retracted away from the sheet-shaped electrodes 1 stacked in the magazine by the plate advancing/retracting mechanism 62 and the plate deformation mechanism 63, as shown in FIG. 5F. As a result, the topmost sheet-shaped electrode 1 picked up and held by the transfer plate 611 is taken out. At this time, the transfer plate 612, together with the first holding member 622 and the second holding member 632, is retracted away from the receiving holder 40 by the plate advancing/retracting mechanism 62 and the plate deformation mechanism 63.

When the state shown in FIG. 5F is achieved, the rotational axis 64a is rotated by the drive source as shown in FIG. 5G. As a result, the transfer plates 611 and 612 move circumferentially around the rotational axis 64a. At this time, the receiving holder 40, which has received, from the transfer plate 612, the sheet-shaped electrode 1 that has been taken out, conveys the received sheet-shaped electrode 1 from the receiving position to the placement position.

Then, as shown in FIG. 5H, the transfer plates 611 and 612 are moved to positions where they are inverted from each other according to the rotation of the rotational axis 64a, and the upper and lower positions of the transfer plates 611 and 612 are switched. Accordingly, the transfer device 80 is switched to the second takeout state. While the receiving holder 40 is conveying the received sheet-shaped electrode 1 to the placement position, a receiving holder 40 other than the above receiving holder 40 is moved to the receiving position.

The transfer device 80 thus placed in the second takeout state performs the fifth process by the transfer plate 611 while the first process, the second process, the third process, and the fourth process are performed by the transfer plate 612.

According to this embodiment described above, it is possible to shorten the time from when the topmost sheet-shaped electrode 1 is taken out to when the sheet-shaped electrode 1 that has been taken out is transferred to the receiving holder 40. Therefore, according to this embodiment, in addition to the effect described in the first embodiment, the takeout of the topmost sheet-shaped electrode 1 and the transfer of the sheet-shaped electrode 1 that has been taken out to the receiving holder 40 can be performed repeatedly at high speed.

It should be noted that the present disclosure is not limited to the embodiments described above, and may be appropriately modified without departing from the spirit of the present disclosure. In the embodiments described above, by rotating the restraining blades 12 and 52 about an axis extending in the Z-axis direction, the restraining blades 12 and 52 are inserted into the space formed between the topmost sheet-shaped electrode 1 and a sheet-shaped electrode 1 provided below the topmost sheet-shaped electrode 1 and are retracted from the upper side of the sheet-shaped electrode 1. However, this is merely one example. For example, by moving the restraining blades 12 and 52 in the X direction or the Y direction, the restraining blades 12 and 52 may be inserted into the space formed between the topmost sheet-shaped electrode 1 and a sheet-shaped electrode 1 provided below the topmost sheet-shaped electrode 1 and retracted from the upper side of the sheet-shaped electrode 1.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A sheet takeout method performed by a sheet takeout device for taking out a topmost sheet member from among a plurality of sheet members horizontally placed on a placement station in a pre-stacked state, wherein the sheet takeout device comprises:

a restraint device that comprises a restraining blade for restraining the plurality of sheet members from an upper side of a stacking direction thereof, is arranged on a side of the placement station, and is configured to be able to switch between a restrained state for restraining the plurality of sheet members by the restraining blade from the upper side of the stacking direction and a non-restrained state for retracting the restraining blade from the upper side of the plurality of sheet members and releasing the restraint by the restraining blade; and a transfer device that comprises a transfer plate including a plurality of pickup and holding parts for picking up and holding the topmost sheet member from the upper side of the stacking direction in which the plurality of sheet members are stacked, is arranged so as to be opposed to the restraint device in a short direction of the sheet member with the placement station therebetween, and is configured to be able to switch a state of the transfer plate between a horizontal state in which the transfer plate is opposed to the topmost sheet member so as to be parallel thereto and an elastically deformed state in which an elastically deformable elastic deformation part including the pickup and holding part arranged in one end side or both end sides of the sheet member in a longitudinal direction that is orthogonal to the short direction is elastically deformed so as to deflect upward, and the sheet takeout method comprises:

a first process of pressing, when the restraint device is in the restrained state, the transfer plate which is in the horizontal state against the topmost sheet member from the upper side of the stacking direction in which the plurality of sheet members are stacked to pickup and hold the topmost sheet member;

a second process of pressing, after the first process, the plurality of sheet members from the upper side of the stacking direction by an inelastic deformation part of the transfer plate which is in the elastically deformed state while setting the restraint device to be in the non-restrained state and setting the transfer plate to be in the elastically deformed state;

a third process of inserting, after the second process, the restraining blade into a space formed between the topmost sheet member and a sheet member provided below the topmost sheet member by setting the transfer plate to be in the elastically deformed state in the second process, and setting the restraint device to be in the restrained state again;

a fourth process of returning, after the third process, the transfer plate that has picked up and held the topmost sheet member to the horizontal state while retracting the transfer plate upward; and a fifth process of transferring, after the fourth process, the topmost sheet member picked up and held by the transfer plate to a receiving holder.

2. The sheet takeout method according to claim 1, wherein the sheet takeout device comprises:

a plate deformation mechanism for elastically deforming the elastic deformation part, and the plate deformation mechanism comprises:

a tension mechanism which applies a tensile force to a wire member whose front end is attached to the pickup and holding part located in the elastic deformation part, which is opposite to the inelastic deformation part, or a cam mechanism which converts a power of a drive mechanism into an operation of advancing and retracting the pickup and holding part located in the elastic deformation part, which is opposite to the inelastic deformation part.

3. The sheet takeout method according to claim 1, wherein the transfer plate is configured to elastically deform, in the elastically deformed state, by no more than a predetermined amount to limit a bending amount of the sheet member picked up and held by the transfer plate which is in the elastically deformed state.

4. The sheet takeout method according to claim 1, wherein the transfer device comprises a pair of the transfer plates, and the transfer device is configured to be able to perform:

a first takeout state in which, while the first process, the second process, the third process, and the fourth process are performed by one of the transfer plates, the fifth process is performed by the other transfer plate; and a second takeout state in which the fifth process is performed by one of the transfer plates while the first process, the second process, the third process, and the fourth process are performed by the other transfer plate.

\* \* \* \* \*